US012153370B2

(12) United States Patent
Ishida et al.

(10) Patent No.: US 12,153,370 B2
(45) Date of Patent: Nov. 26, 2024

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Tomohito Ishida, Shizuoka (JP); Shuntaro Watanabe, Kanagawa (JP); Nobuhiro Nakamura, Shizuoka (JP); Tatsuya Yamaai, Kanagawa (JP); Hiroyuki Watanabe, Shizuoka (JP); Masatada Hirota, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/525,277

(22) Filed: Nov. 30, 2023

(65) Prior Publication Data

US 2024/0118635 A1 Apr. 11, 2024

Related U.S. Application Data

(63) Continuation of application No. PCT/JP2022/022954, filed on Jun. 7, 2022.

(30) Foreign Application Priority Data

Jun. 11, 2021 (JP) ................................. 2021-098346
Jun. 1, 2022 (JP) ................................. 2022-089702

(51) Int. Cl.
*G03G 15/00* (2006.01)
*G03G 5/047* (2006.01)
(Continued)

(52) U.S. Cl.
CPC ............. *G03G 15/75* (2013.01); *G03G 5/047* (2013.01); *G03G 5/1476* (2013.01);
(Continued)

(58) Field of Classification Search
CPC .... G03G 15/75; G03G 15/751; G03G 15/752; G03G 21/1839; G03G 5/047; G03G 5/1476; G03G 2221/183
See application file for complete search history.

(56) References Cited

U.S. PATENT DOCUMENTS 5,252,418 A 10/1993 Ishikawa
8,455,170 B2 6/2013 Nakamura et al.
(Continued)

FOREIGN PATENT DOCUMENTS

JP 3-155559 A 7/1991
JP 2001-305775 A 11/2001
(Continued)

OTHER PUBLICATIONS

U.S. Appl. No. 18/489,936, Tatsuya Yamaai, filed Oct. 19, 2023.
(Continued)

*Primary Examiner* — Joseph S Wong
(74) *Attorney, Agent, or Firm* — VENABLE LLP

(57) ABSTRACT

Provided is an electrophotographic photosensitive member that achieves satisfactory transferability. An electrophotographic photosensitive member including a charge generating layer, a charge transporting layer, and a protection layer laminated on a support in the stated order, wherein the protection layer contains a binder resin and particles, and wherein when an average thickness of the protection layer in a site free of the particles is represented by T and a volume-average particle diameter of the particles is represented by Dm in a cross-section of the protection layer, the following formula (a) is satisfied.

$$Dm > T \quad \text{Formula(a)}$$

12 Claims, 3 Drawing Sheets

(51) Int. Cl.
*G03G 5/147* (2006.01)
*G03G 21/18* (2006.01)

(52) U.S. Cl.
CPC ......... *G03G 15/751* (2013.01); *G03G 15/752* (2013.01); *G03G 21/1839* (2013.01); *G03G 2221/183* (2013.01)

(56) References Cited

U.S. PATENT DOCUMENTS

| | | | |
|---|---|---|---|
| 9,029,054 B2 | 5/2015 | Okuda et al. | |
| 9,040,214 B2 | 5/2015 | Fujii et al. | |
| 9,046,797 B2 | 6/2015 | Fujii et al. | |
| 9,063,505 B2 | 6/2015 | Sekiya et al. | |
| 9,069,267 B2 | 6/2015 | Kaku et al. | |
| 9,256,145 B2 | 2/2016 | Fujii et al. | |
| 9,304,416 B2 | 4/2016 | Noguchi et al. | |
| 9,372,417 B2 | 6/2016 | Fujii et al. | |
| 9,372,418 B2 | 6/2016 | Shida et al. | |
| 9,372,419 B2 | 6/2016 | Tsuji et al. | |
| 9,523,929 B2 | 12/2016 | Nakamura et al. | |
| 9,535,346 B2 | 1/2017 | Sekiya et al. | |
| 9,599,915 B2 | 3/2017 | Anezaki et al. | |
| 9,599,917 B2 | 3/2017 | Okuda et al. | |
| 9,726,992 B2 | 8/2017 | Sakuma et al. | |
| 10,073,362 B2 | 9/2018 | Fujil et al. | |
| 10,372,050 B2 | 8/2019 | Nishi et al. | |
| 10,416,581 B2 | 9/2019 | Ito et al. | |
| 10,452,021 B2 | 10/2019 | Miura et al. | |
| 10,539,892 B2 | 1/2020 | Nishida et al. | |
| 10,545,453 B2 | 1/2020 | Iwasaki et al. | |
| 10,558,132 B2 | 2/2020 | Ishiduka et al. | |
| 10,558,133 B2 | 2/2020 | Nakamura et al. | |
| 10,642,177 B2 | 5/2020 | Nakamura et al. | |
| 10,691,033 B2 | 6/2020 | Nishida et al. | |
| 10,747,130 B2 | 8/2020 | Okuda et al. | |
| 10,747,131 B2 | 8/2020 | Watanabe et al. | |
| 10,831,118 B2 | 11/2020 | Watanabe et al. | |
| 10,838,315 B2 | 11/2020 | Shimozawa et al. | |
| 11,003,102 B2 | 5/2021 | Ishiduka et al. | |
| 11,126,097 B2 | 9/2021 | Ishida et al. | |
| 11,181,837 B2 | 11/2021 | Sekiya et al. | |
| 11,237,493 B2 | 2/2022 | Makisumi et al. | |
| 11,249,407 B2 | 2/2022 | Watariguchi et al. | |
| 11,256,186 B2 | 2/2022 | Shimozawa et al. | |
| 11,366,402 B2 | 6/2022 | Ishiduka et al. | |
| 11,392,050 B2 | 7/2022 | Nishida et al. | |
| 11,392,074 B2 | 7/2022 | Ishida et al. | |
| 11,782,353 B2 | 10/2023 | Nakamura et al. | |
| 2014/0113225 A1 | 4/2014 | Yoshimura | |
| 2017/0285496 A1* | 10/2017 | Maeda | G03G 5/087 |
| 2019/0243260 A1* | 8/2019 | Ito | G03G 5/144 |
| 2020/0133147 A1* | 4/2020 | Takizawa | G03G 5/056 |
| 2020/0142344 A1 | 5/2020 | Ikeda | |
| 2021/0325794 A1 | 10/2021 | Iwasaki et al. | |
| 2023/0058278 A1 | 2/2023 | Maruyama et al. | |
| 2023/0059041 A1 | 2/2023 | Kaku et al. | |
| 2023/0059773 A1 | 2/2023 | Yamaai et al. | |
| 2023/0115474 A1 | 4/2023 | Watanabe et al. | |
| 2023/0124743 A1 | 4/2023 | Nakamura et al. | |
| 2023/0288836 A1 | 9/2023 | Iwasaki et al. | |
| 2024/0004322 A1 | 1/2024 | Makisumi et al. | |

FOREIGN PATENT DOCUMENTS

| | | |
|---|---|---|
| JP | 2009-14915 A | 1/2009 |
| JP | 2013-29812 A | 2/2013 |
| JP | 2016-118628 A | 6/2016 |
| JP | 2019-45862 A | 3/2019 |
| JP | 2020-71423 A | 5/2020 |

OTHER PUBLICATIONS

U.S. Appl. No. 18/524,566, Shuntaro Watanabe, filed Nov. 30, 2023.
Handbook of Chemistry: Pure Chemistry, Revised 4th ed. (edited by The Chemical Society of Japan, Maruzen Co., Ltd.), vol. II, p. 517.

* cited by examiner

ELECTROPHOTOGRAPHIC PHOTOSENSITIVE MEMBER, PROCESS CARTRIDGE AND ELECTROPHOTOGRAPHIC APPARATUS

CROSS-REFERENCE TO RELATED APPLICATIONS

This application is a Continuation of International Patent Application No. PCT/JP2022/022954, filed Jun. 7, 2022, which claims the benefit of Japanese Patent Application No. 2021-098346, filed Jun. 11, 2021, and Japanese Patent Application No. 2022-089702, filed Jun. 1, 2022, all of which are hereby incorporated by reference herein in their entirety.

BACKGROUND OF THE INVENTION

Field of the Invention

The present invention relates to an electrophotographic photosensitive member, and a process cartridge and an electrophotographic apparatus each including the electrophotographic photosensitive member.

Description of the Related Art

In recent years, in the field of electrophotographic apparatus, such as a copying machine and a printer, there has been a demand for high-speed printing in order to enhance productivity. In order to achieve an increase in speed in the electrophotographic apparatus, it is required that, in a repetition of a charging step, an exposing step, a developing step, and a transferring step of an electrophotographic process, a latent image formed in the exposing step be developed with toner in the developing step, and the toner be efficiently transferred onto a medium, such as paper or an intermediate transfer member.

In the transferring step, in order to transfer the toner with which the latent image on the photosensitive member has been developed onto the recording medium, a predetermined bias has been applied to the toner. With regard to the bias to be applied, the bias to be applied can be reduced as follows: an external additive is added to the toner to produce an uneven shape on the surface of the photosensitive member, to thereby reduce the adhesive property of the toner to the surface of the photosensitive member. Thus, a space for a high-voltage power source for applying a high bias can be saved in the electrophotographic apparatus. Moreover, the scattering of the toner caused by a high transfer bias can be suppressed, and hence an improvement in image quality can be achieved. The following has heretofore been proposed as one method of reducing the adhesive force of the toner to the surface of the photosensitive member through the production of the uneven shape on the surface of the photosensitive member: in order that contact between the toner and the surface of the photosensitive member may become point contact, particles are incorporated into the surface of the electrophotographic photosensitive member to form convex shapes thereon.

In Japanese Patent Application Laid-Open No. 2020-71423, there is a disclosure of an electrophotographic photosensitive member in which the surface of an outermost layer formed of a polymerized cured product of a composition containing a polymerizable monomer and an inorganic filler has a convex structure for the purpose of improving a cleaning property to reduce the abrasion of a photosensitive member and a cleaning blade irrespective of the supply amount of a lubricant.

In Japanese Patent Application Laid-Open No. 2019-45862, there is a disclosure of an electrophotographic photosensitive member which has a surface layer obtained by curing a coating film containing at least one kind of organic resin particles of acrylic resin particles and melamine resin particles and a hole transporting compound having a polymerizable functional group for the purpose of achieving both the abrasion resistance and the lubricity of a photosensitive member.

In Japanese Patent Application Laid-Open No. 2016-118628, there is a disclosure of an electrophotographic photosensitive member which contains a curable resin and polytetrafluoroethylene particles and in which the surface of a surface layer has an uneven shape formed by mechanical polishing for the purpose of reducing image unevenness caused by gloss unevenness of a support while keeping abrasion resistance.

In Japanese Patent Application Laid-Open No. 2013-029812, there is a disclosure of an electrophotographic photosensitive member containing encapsulated spherical particles encapsulated in pores in a matrix component for the purpose of improving the lubricity and cleaning property of the surface of a photosensitive member.

In Japanese Patent Application Laid-Open No. 2009-14915, there is a disclosure of an electrophotographic photosensitive member in which independent concave portions each having a depth of 0.1 to 10 μm are formed on the surface of a surface layer of the photosensitive member and a releasing material is incorporated into each of the concave portions for the purpose of maintaining a releasing effect.

In recent years, the electrophotographic apparatus has been required to achieve both the increase in efficiency of the transferring step for reducing waste toner in order to meet environmental demands and the high image quality in high-speed output. In order to improve transferability, it is effective to reduce the contact area between the toner and the photosensitive member. As means for this, in each of Japanese Patent Application Laid-Open No. 2020-71423, Japanese Patent Application Laid-Open No. 2019-45862, Japanese Patent Application Laid-Open No. 2016-118628, Japanese Patent Application Laid-Open No. 2013-029812, and Japanese Patent Application Laid-Open No. 2009-14915 described above, there is a disclosure of a technology involving adding particles to the surface of the photosensitive member. However, in Japanese Patent Application Laid-Open No. 2020-71423, Japanese Patent Application Laid-Open No. 2019-45862, and Japanese Patent Application Laid-Open No. 2016-118628, it is difficult to evenly expose and align the particles on the surface of the photosensitive member, and there is a problem in arranging the particles that contribute to transfer. In FIG. 2, there is illustrated an image of the arrangement of the particles present on the surface of the photosensitive member in each of Japanese Patent Application Laid-Open No. 2020-71423, Japanese Patent Application Laid-Open No. 2019-45862, and Japanese Patent Application Laid-Open No. 2016-118628.

Further, in Japanese Patent Application Laid-Open No. 2013-029812, the following phenomenon was observed. When there is a peripheral speed difference between the photosensitive member and the intermediate transfer member or recording medium in the transferring step, the encapsulated spherical particles move, and the contact area between the toner and the surface of the photosensitive member is increased to reduce transferability. In addition, in Japanese Patent Application Laid-Open No. 2009-14915, the following was found. A plurality of releasing materials are incorporated into the concave portions, and hence the point contact between the toner and the surface of the photosensitive member is not able to be maintained, with the result that it is difficult to maintain satisfactory transferability for a long period of time.

SUMMARY OF THE INVENTION

The inventors of the present invention have made extensive investigations, and as a result, have found that particles can be stably exposed by holding the particles with a layer thinner than the particle diameter as illustrated in FIG. 1. That is, a protection layer is formed on the surface of a photosensitive member, and the protection player contains a binder resin and particles. In the case where the average thickness of the protection layer of a site free of the particles is represented by T and the volume-average particle diameter of the particles is represented by Dm in the cross-section of the protection layer, when the following formula (a) is satisfied, the particles can be evenly exposed and aligned, and satisfactory transferability is achieved.

$$Dm>T \quad \text{Formula (a)}$$

An object of the present invention is to provide a photosensitive member in which particles are stably exposed by holding the particles with a layer thinner than the particle diameter in a configuration in which the particles are arranged on the surface of the photosensitive member, to thereby achieve satisfactory transferability.

The above-mentioned object can be achieved by the present invention described below. That is, an electrophotographic photosensitive member according to the present invention includes a charge generating layer, a charge transporting layer, and a protection layer laminated on a support in the stated order, wherein the protection layer contains a binder resin and particles, and wherein when an average thickness of the protection layer in a site free of the particles is represented by T and a volume-average particle diameter of the particles is represented by Dm in a cross-section of the protection layer, the following formula (a) is satisfied.

$$Dm>T \quad \text{Formula (a)}$$

Further features of the present invention will become apparent from the following description of exemplary embodiments with reference to the attached drawings.

DESCRIPTION OF THE EMBODIMENTS

An exemplary embodiment of the present invention is described below.

[Electrophotographic Photosensitive Member]

An electrophotographic photosensitive member of the present invention includes a support, and a charge generating layer, a charge transporting layer, and a protection layer containing particles formed on the support. The electrophotographic photosensitive member according to the present invention may be used as a cylindrical electrophotographic photosensitive member in which a charge generating layer, a charge transporting layer, and a protection layer are formed on a cylindrical support, but a shape, such as a belt shape or a sheet shape, may also be used.

The electrophotographic photosensitive member of the present invention is used in an image forming method including a charging step of charging the surface of the electrophotographic photosensitive member, an exposing step of exposing the charged electrophotographic photosensitive member to form an electrostatic latent image, a developing step of supplying toner to the electrophotographic photosensitive member having the electrostatic latent image formed thereon to form a toner image, and a transferring step of transferring the toner image formed on the electrophotographic photosensitive member.

As a method of producing the electrophotographic photosensitive member of the present invention, there is given a method involving preparing coating liquids for the respective layers to be described later, applying the coating liquids in a desired order of layers, and drying the coating liquids. In this case, examples of a method of applying the coating liquid include dip coating, spray coating, inkjet coating, roll coating, die coating, blade coating, curtain coating, wire bar coating, and ring coating. Of those, dip coating is preferred from the viewpoints of efficiency and productivity.

The present invention is directed to an electrophotographic photosensitive member, including a charge generating layer, a charge transporting layer, and a protection layer laminated on a support in the stated order, wherein the protection layer contains a binder resin and particles, and wherein when an average thickness of the protection layer in a site free of the particles is represented by T and a volume-average particle diameter of the particles is represented by Dm in a cross-section of the protection layer, the following formula (a) is satisfied.

$$Dm>T \quad \text{Formula (a)}$$

Figure 1:
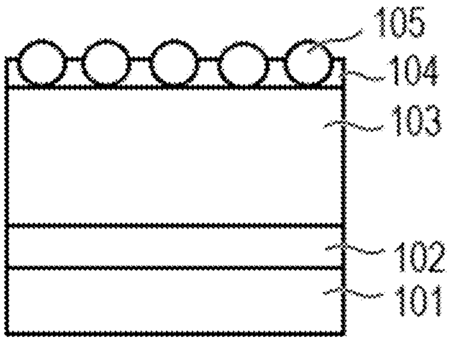
FIG. 1 is a conceptual diagram of each layer configuration in a cross-section of a photosensitive member according to the present invention.

With the above-mentioned configuration, the particles can be evenly exposed and aligned on the surface of the photosensitive member, and satisfactory transferability can be achieved. In FIG. 1, there is illustrated an image of the arrangement of the particles present on the surface of the photosensitive member of the present invention. Although the mechanism in which the problem is solved by the configuration of the present invention is not clear, the mechanism is presumed as described below.

To improve transferability in an electrophotographic image forming apparatus, the adhesive property of toner to the electrophotographic photosensitive member needs to be reduced. The adhesive force between the toner and the electrophotographic photosensitive member is roughly classified into an electrostatic adhesive force and a non-electrostatic adhesive force. The electrostatic adhesive force is mainly caused by a reflection force, and hence largely depends on the charge quantity of the toner. The magnitude of the reflection force is proportional to the charge quantity of the toner, and is inversely proportional to the square of a distance between the toner and the surface of the photosensitive member to which the toner is to adhere. From the viewpoint of securing the distance between the toner and the surface of the photosensitive member, a method of arranging the particles on the surface layer of the photosensitive member to attenuate the reflection force is often adopted. At the same time, in order to reduce the non-electrostatic adhesive force, it is also required to reduce the Van der Waals force. In order to reduce the van der Waals force, it is effective to mechanically reduce the contact area between the toner and the electrophotographic photosensitive member.

In this case, it is conceived to be ideal that the particle surfaces exposed to the surface of the protection layer of the electrophotographic photosensitive member of the present invention support the toner particles at an equal height. In the present invention, the particles can be exposed at an equal height by forming the protection layer containing the particles on the outermost surface of the photosensitive member to a thickness smaller than the particle diameter of each of the particles.

In addition, in the case where the universal hardness (HU) of the charge transporting layer under the protection layer is represented by H1 and the universal hardness (HU) of the protection layer is represented by H2, when the following formula (b) is satisfied, the embedment of the exposed particles can be suppressed even at the time of repeated printing, and satisfactory transferability can be maintained for a long period of time.

$$H1>H2 \qquad \text{Formula (b)}$$

In addition, similarly, in the case where the elastic deformation ratio (We) of the charge transporting layer under the protection layer is represented by G1 and the elastic deformation ratio (We) of the protection layer is represented by G2, when the following formula (c) is satisfied, the embedment of the exposed particles can be suppressed even at the time of repeated printing, and satisfactory transferability can be maintained for a long period of time.

$$G1>G2 \qquad \text{Formula (c)}$$

The reason for the foregoing is presumed as described below. When a pressing force is applied to the particles exposed to the surface in an electrophotographic image-forming process, the particles are pushed back at an interface between an upper surface of the charge transporting layer and a lower layer of the protection layer, and thus the embedment of the particles can be suppressed.

In addition, when the standard deviation of the volume-average particle diameter Dm of the particles and a ratio Dm/Dn of the volume-average particle diameter Dm and the number-average particle diameter Dn are decreased, the number of the particles to be embedded in the protection layer can be suppressed, and the particle surfaces can be exposed more uniformly. Specifically, when the standard deviation is 20% or less of the particle diameter, and the Dm/Dn is 1.5 or less, the uniform particle exposure is more stably enabled.

Further, when the variation range of the thickness T of the protection layer in a site in which the particles are not present is smaller, the embedment of the particles is suppressed, and the particles can be stably exposed. Specifically, the variation range is preferably 20% or less of the thickness.

Figure 2:
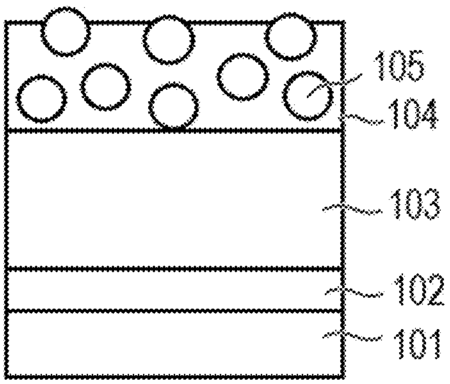
FIG. 2 is a conceptual diagram of each layer configuration in a cross-section of a photosensitive member of the related art.
Figure 3:
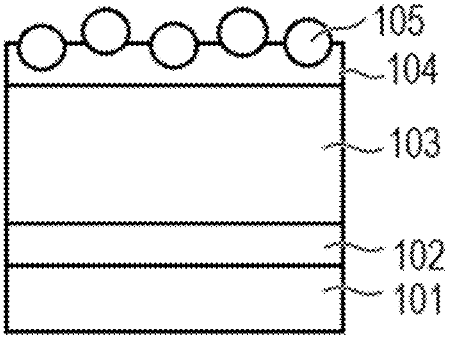
FIG. 3 is a conceptual diagram of each layer configuration in the cross-section of the photosensitive member.

In addition, when a large number of particles are brought into contact with the interface formed by the lower layer of the protection layer and the upper surface of the charge transporting layer, the embedment of the particles at the time of repeated use can be suppressed. The reason for this is presumed as described below. In the case where a pressing force is applied to the particles exposed to the surface in the electrophotographic image-forming process, when the particles are separated from the interface as illustrated in FIG. 3, the particles are embedded in the protection layer. Meanwhile, when the particles are in contact with the interface between the upper surface of the charge transporting layer and the lower layer of the protection layer as illustrated in FIG. 1, the particles are less liable to be embedded into an inner portion of the charge transporting layer that is a lower layer. Specifically, when 50% or more of all the particles are in contact with the upper surface of the charge transporting layer, the embedment of the particles can be effectively suppressed. That is, it is preferred that the number of the particles (so-called "bottoming particles"), which are partially exposed from the protection layer, and which are in contact with the upper surface of the charge transporting layer, in the cross-section of the protection layer be 50% by number or more with respect to the total number of the particles contained in the protection layer. In FIG. 1, FIG. 2, and FIG. 3, there are illustrated a support 101, a charge generating layer 102, a charge transporting layer 103, a protection layer 104, and particles 105.

Figure 4:
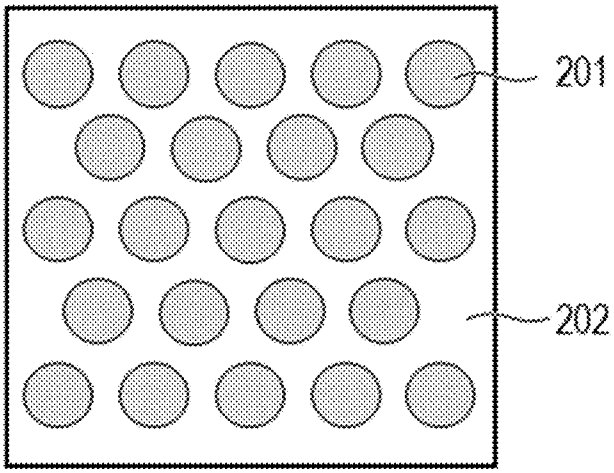
FIG. 4 is a conceptual diagram of the exposed area of particles when the photosensitive member is viewed from a top.

Further, in order to achieve satisfactory transfer, it is required that a large amount of toner be brought into contact with the particles on the photosensitive member. That is, at least some of the particles are partially exposed from the surface of the protection layer, and in the case where the exposed area of exposed portions (201) of the particles when the surface of the photosensitive member is viewed from the upper surface is represented by S1 and the area of a portion (202) other than the exposed portions of the particles is represented by S2 as illustrated in FIG. 4, when the following formula (d) is satisfied, a large amount of toner can be brought into contact with the particles, and satisfactory transferability can be achieved.

$$S1/(S1+S2)>0.50 \qquad \text{Formula (d)}$$

Further, when the volume-average particle diameter Dm of the particles and the average thickness T of the protection layer satisfy the following formula (e), the particles can be exposed more stably, and satisfactory transferability can be achieved.

$$Dm>2T \qquad \text{Formula (e)}$$

In addition, in the case where the universal hardness (HU) of the binder resin of the charge transporting layer is represented by H1, the universal hardness (HU) of the binder resin component of the protection layer is represented by H2, and the hardness of each of the particles is represented by H3, when the following formulae (f) and (g) are satisfied, the embedment of the particles can be suppressed, and satisfactory transferability can be achieved for a long period of time.

$$H3>H2 \qquad \text{Formula (f)}$$

$$H3>H1>H2 \qquad \text{Formula (g)}$$

The above-mentioned mechanism is based on the assumption, and this assumption does not influence the technical scope of the present invention.

The particles contained in the protection layer of the electrophotographic photosensitive member of the present invention are not particularly limited. Examples of the particles include: organic resin particles such as acrylic resin particles; inorganic particles made of alumina, silica, titania, or the like; and organic-inorganic hybrid particles.

In addition, electroconductive particles or a charge transporting substance may be added to a coating liquid for a protection layer for the purpose of improving the charge transporting ability of the protection layer. As the electroconductive particles, an electroconductive pigment used in an electroconductive layer may be used. As the charge transporting substance, a charge transporting substance described later may be used. In addition, additives may be added for the purpose of improving the various functions. Examples of the additives include electroconductive particles, an antioxidant, a UV absorber, a plasticizer, and a leveling agent.

Examples of the organic resin particles include crosslinked polystyrene, a crosslinked acrylic resin, a phenol resin, a melamine resin, polyethylene, polypropylene, acrylic particles, polytetrafluoroethylene particles, and silicone particles.

The acrylic particles each contain a polymer of an acrylic acid ester or a methacrylic acid ester. Of those, styrene acrylic particles are more preferred. There is no particular limitation on the polymerization degree of an acrylic resin or a styrene acrylic resin, or on whether the resin is thermoplastic or thermosetting.

The polytetrafluoroethylene particles only need to be particles formed mainly of a tetrafluoroethylene resin, and the particles may each contain a trifluorochloroethylene resin, a hexafluoropropylene resin, a vinyl fluoride resin, a vinylidene fluoride resin, a difluorodichloroethylene resin, or the like in addition to the tetrafluoroethylene resin.

As the organic-inorganic hybrid particles, there are given polymethylsilsesquioxane particles each containing a siloxane bond.

As the particles contained in the protection layer of the electrophotographic photosensitive member of the present invention, inorganic particles that have high hardness and are advantageous in point contact with the toner are preferably used.

Examples of the inorganic particles include magnesium oxide, zinc oxide, lead oxide, tin oxide, tantalum oxide, indium oxide, bismuth oxide, yttrium oxide, cobalt oxide, copper oxide, manganese oxide, selenium oxide, iron oxide, zirconium oxide, germanium oxide, tin oxide, titanium oxide, niobium oxide, molybdenum oxide, vanadium oxide, copper aluminum oxide, antimony ion-doped tin oxide, and hydrotalcite. Those particles may be used alone or in combination thereof. In addition, the particles may be synthetic products or commercially available products. In addition, silica particles are preferred as the inorganic particles.

Known silica fine particles may be used as the silica particles, and the fine particles of dry silica and the fine particles of wet silica may each be used. Of those, the fine particles of wet silica obtained by a sol-gel method (hereinafter also referred to as "sol-gel silica") are preferred.

The sol-gel silica used as the particles to be incorporated into the protection layer of the electrophotographic photosensitive member of the present invention may be hydrophilic, or its surface may be subjected to hydrophobic treatment.

A method for the hydrophobic treatment is, for example, a method including removing a solvent from a silica sol suspension in the sol-gel method to dry the suspension, and then treating the dried product with a hydrophobic treatment agent, or a method including directly adding the hydrophobic treatment agent to the silica sol suspension to dry and treat the suspension simultaneously. Of those, an approach including directly adding the hydrophobic treatment agent to the silica sol suspension is preferred from the viewpoints of the control of the half-width of the particle size distribution and the control of the saturated moisture adsorption amount.

Examples of the hydrophobic treatment agent include the following:

chlorosilanes, such as methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes, such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropylmethyldimethoxysilane;

silazanes, such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, and dimethyltetravinyldisilazane;

silicone oils, such as a dimethyl silicone oil, a methyl hydrogen silicone oil, a methyl phenyl silicone oil, an alkyl-modified silicone oil, a chloroalkyl-modified silicone oil, a chlorophenyl-modified silicone oil, a fatty acid-modified silicone oil, a polyether-modified silicone oil, an alkoxy-modified silicone oil, a carbinol-modified silicone oil, an amino-modified silicone oil, a fluorine-modified silicone oil, and an end reactive silicone oil;

siloxanes, such as hexamethylcyclotrisiloxane, octamethylcyclotetrasiloxane, decamethylcyclopentasiloxane, hexamethyldisiloxane, and octamethyltrisiloxane; and as fatty acids and metal salts thereof, long-chain fatty acids, such as undecylic acid, lauric acid, tridecylic acid, dodecylic acid, myristic acid, palmitic acid, pentadecylic acid, stearic acid, heptadecylic acid, arachic acid, montanic acid, oleic acid, linoleic acid, and arachidonic acid, and salts of those fatty acids and metals, such as zinc, iron, magnesium, aluminum, calcium, sodium, and lithium.

Of those, alkoxysilanes, silazanes, and silicone oils are each preferably used because the hydrophobic treatment is easily performed. Those hydrophobic treatment agents may be used alone or in combination thereof.

In the electrophotographic photosensitive member of the present invention, any of the configurations: a laminate type photosensitive layer including a charge generating layer and a charge transporting layer on a support; and a monolayer type photosensitive layer containing both of a charge generating substance and a charge transporting substance on a support may be used. In any of the configurations, a protection layer having particles dispersed therein is formed as the surface layer thereof.

The support and the respective layers are described below.

<Support>

The electrophotographic photosensitive member of the present invention includes a support. In the present invention, the support is preferably an electroconductive support having electroconductivity. In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, electroconductivity may be imparted to the resin or the glass through treatment involving, for example, mixing or coating with an electroconductive material.

<Photosensitive Layer>

The photosensitive layers of the electrophotographic photosensitive member are mainly classified into (1) a laminate type photosensitive layer and (2) a monolayer type photosensitive layer. (1) The laminate type photosensitive layer has a charge generating layer containing a charge generating substance and a charge transporting layer containing a charge transporting substance. (2) The monolayer type photosensitive layer is a photosensitive layer containing both a charge generating substance and a charge transporting substance.

(1) Laminate Type Photosensitive Layer

The laminate type photosensitive layer has the charge generating layer and the charge transporting layer.

(1-1) Charge Generating Layer

The charge generating layer preferably contains the charge generating substance and a resin.

Examples of the charge generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge generating substance in the charge generating layer is preferably 40 to 85 mass %, more preferably 60 to 80 mass % with respect to the total mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge generating layer may further contain an additive, such as an antioxidant or a UV absorber. Specific examples thereof include a hindered phenol compound, a hindered amine compound, a sulfur compound, a phosphorus compound, and a benzophenone compound.

The charge generating layer has an average thickness of preferably 0.1 to 1 μm, more preferably 0.15 to 0.4 μm.

The charge generating layer may be formed by: preparing a coating liquid for a charge generating layer containing the above-mentioned materials and a solvent; forming a coating film of the coating liquid on the support, or an electroconductive layer or an undercoat layer to be described later; and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

(1-2) Charge Transporting Layer

The charge transporting layer preferably contains the charge transporting substance and a resin.

Examples of the charge transporting substance include a polycyclic aromatic compound, a heterocyclic compound, a hydrazone compound, a styryl compound, an enamine compound, a benzidine compound, a triarylamine compound, and a resin having a group derived from any of those substances. Of those, a triarylamine compound and a benzidine compound are preferred, and a compound having the structure of the following formula (1) is suitably used.

(1)

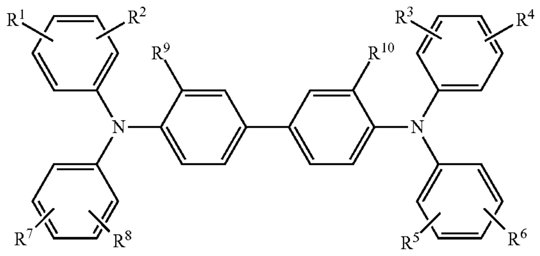

In the formula (1), $R^1$ to $R^{10}$ each independently represent a hydrogen atom or a methyl group.

Examples of the structure represented by the formula (1) are represented in the formulae (1-1) to (1-10). Of those, the structures represented by the formulae (1-1) to (1-6) are more preferred.

(1-1)

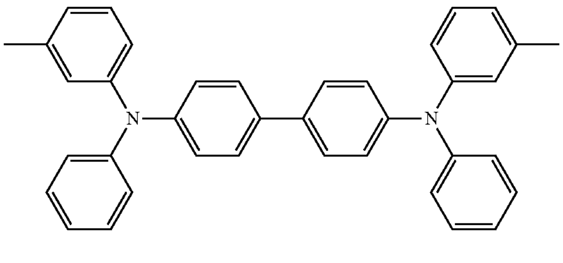

(1-2)

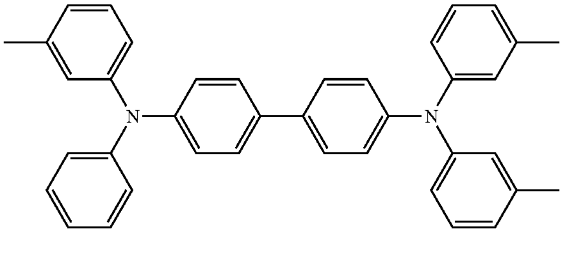

-continued (1-3)

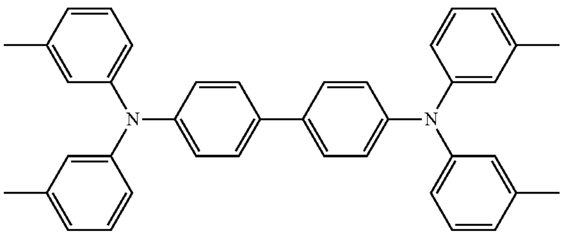

(1-4)

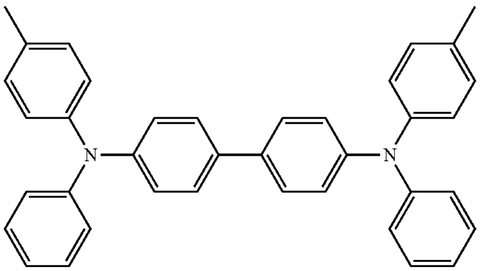

(1-5)

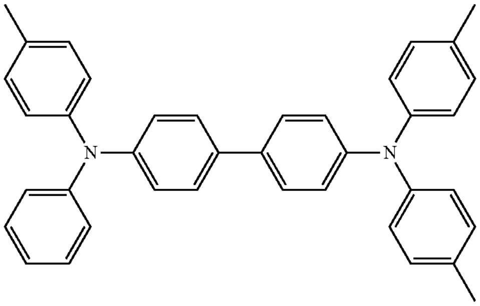

(1-6)

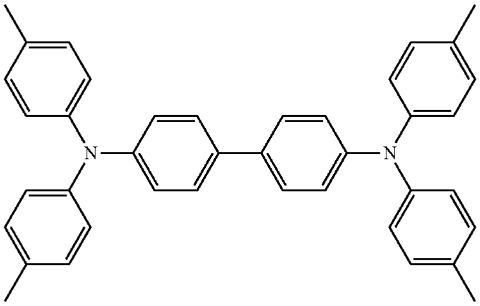

(1-7)

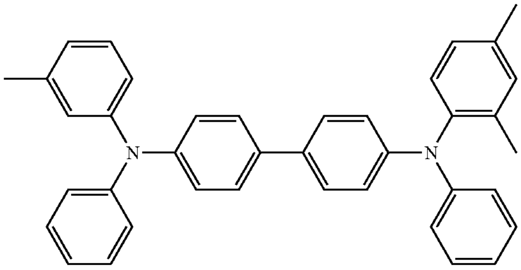

-continued (1-8)

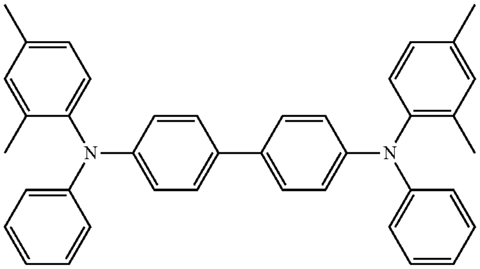

(1-9)

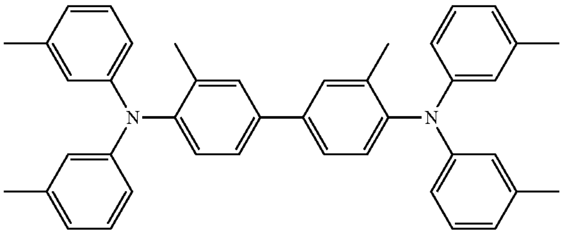

(1-10)

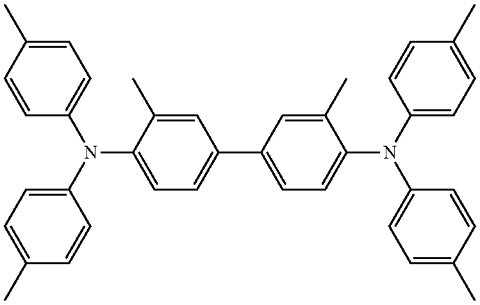

A thermoplastic resin is used as the resin, and examples thereof include a polyester resin, a polycarbonate resin, an acrylic resin, and a polystyrene resin. Of those, a polycarbonate resin and a polyester resin are preferred. A polyarylate resin is particularly preferred as the polyester resin.

The content of the charge transporting substance in the charge transporting layer is preferably 25 to 70 mass %, more preferably 30 to 55 mass % with respect to the total mass of the charge transporting layer.

A content ratio (mass ratio) between the charge transporting substance and the resin is preferably from 4/10 to 20/10, more preferably from 5/10 to 12/10.

In addition, the charge transporting layer may contain an additive, such as an antioxidant, a UV absorber, a plasticizer, a leveling agent, a lubricity-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluororesin particles, polystyrene resin particles, polyethylene resin particles, silica particles, alumina particles, and boron nitride particles.

The charge transporting layer has an average thickness of preferably 5 to 50 μm, more preferably 8 to 40 μm, particularly preferably 10 to 30 μm.

The charge transporting layer may be formed by: preparing a coating liquid for a charge transporting layer containing the above-mentioned materials and a solvent; forming a coating film of the coating liquid on the charge generating layer; and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

(2) Monolayer type Photosensitive Layer

The monolayer type photosensitive layer may be formed by: preparing a coating liquid for a photosensitive layer containing the charge generating substance, the charge transporting substance, a resin, and a solvent; forming a coating film of the coating liquid on the support, the electroconductive layer, or the undercoat layer; and drying the coating film. Examples of the charge generating substance, the charge transporting substance, and the resin are the same as those of the materials in the section “(1) Laminate type Photosensitive Layer.”

<Protection Layer>

In the present invention, a protection layer is arranged on the charge transporting layer. The arrangement of the protection layer can improve the durability of the surface of the electrophotographic photosensitive member.

The protection layer preferably contains electroconductive particles and/or a charge transporting substance, and a resin.

Examples of the electroconductive particles include the particles of metal oxides, such as titanium oxide, zinc oxide, tin oxide, and indium oxide. Examples of the charge transporting substance include a polycyclic aromatic compound, a heterocyclic compound, a hydrazone compound, a styryl compound, an enamine compound, a benzidine compound, a triarylamine compound, and a resin having a group derived from each of those materials. Of those, a triarylamine compound and a benzidine compound are preferred.

Examples of the resin include a polyester resin, an acrylic resin, a phenoxy resin, a polycarbonate resin, a polystyrene resin, a phenol resin, a melamine resin, and an epoxy resin. Of those, a polycarbonate resin, a polyester resin, and an acrylic resin are preferred. In addition, the protection layer may be formed as a cured film by polymerizing a composition containing a monomer having a polymerizable functional group. A reaction in this case is, for example, a thermal polymerization reaction, a photopolymerization reaction, or a radiation polymerization reaction. Examples of the polymerizable functional group of the monomer having a polymerizable functional group include an acryloyl group and a methacryloyl group. A material having a charge transporting ability may be used as the monomer having a polymerizable functional group.

A compound having a polymerizable functional group may have a charge transporting structure as well as a chain-polymerizable functional group. The charge transporting structure is preferably a triarylamine structure in terms of charge transportation. The chain-polymerizable functional group is preferably an acryloyl group or a methacryloyl group. The number of the functional groups may be one, or two or more. A case in which the cured film is formed by incorporating a compound having a plurality of functional groups and a compound having one functional group out of such compounds is particularly preferred because distortion caused by the polymerization of the plurality of functional groups is easily eliminated.

Examples of the compound having one functional group are represented in (2-1) to (2-6).

(2-1)

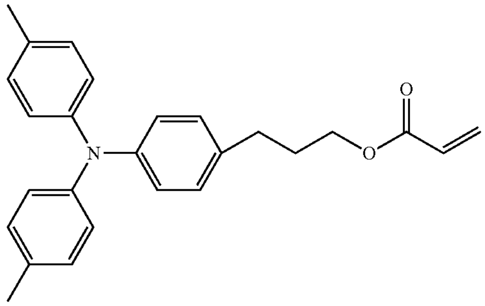

(2-2)

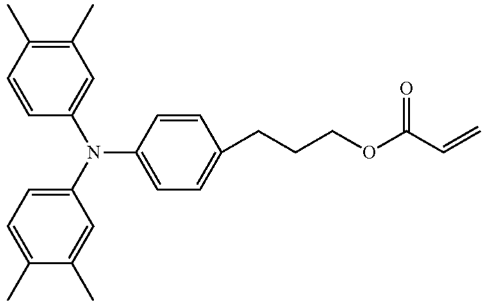

(2-3)

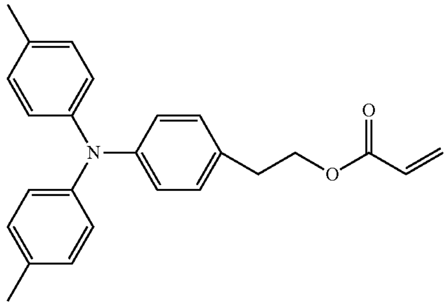

(2-4)

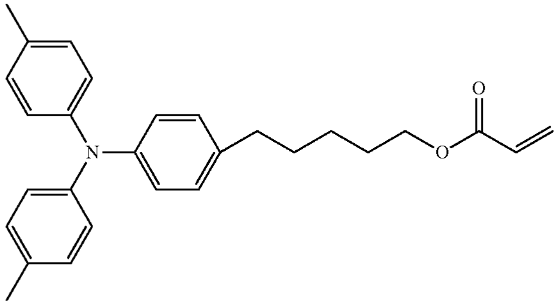

(2-5)

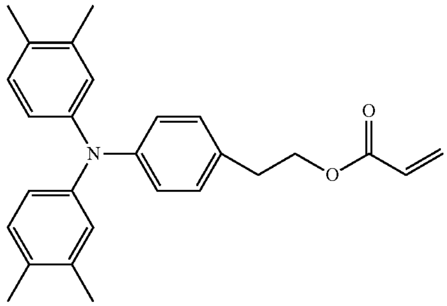

-continued
(2-6)
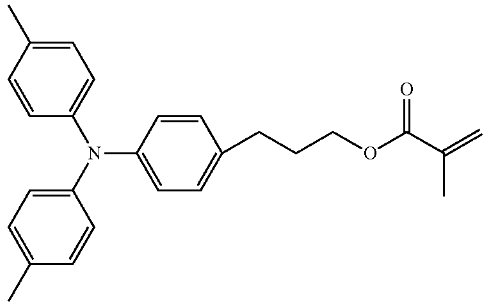
Examples of the compound having a plurality of functional groups are represented in (3-1) to (3-7).
(3-1)
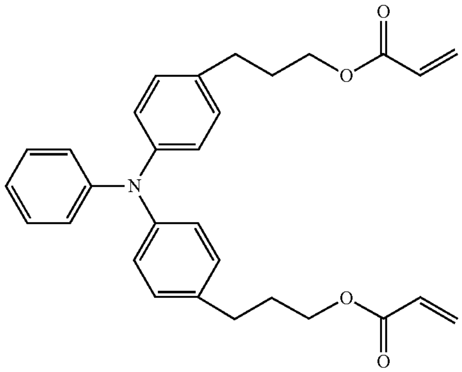
(3-2)
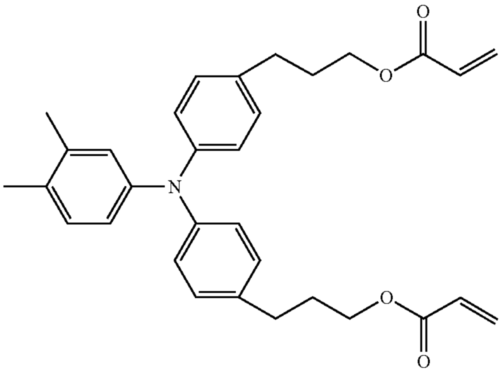
(3-3)
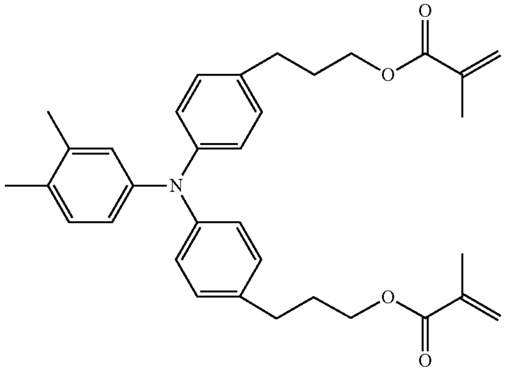
(3-4)
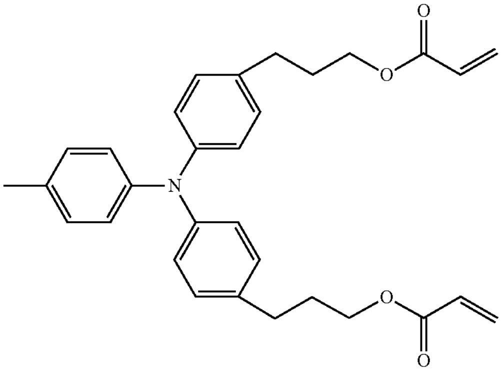
(3-5)
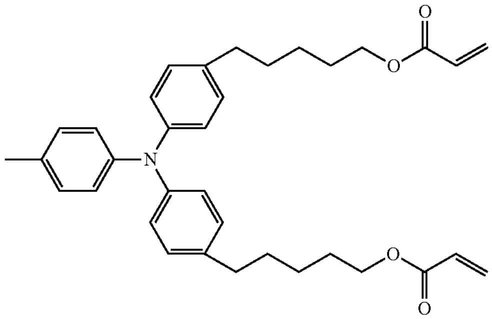
(3-6)
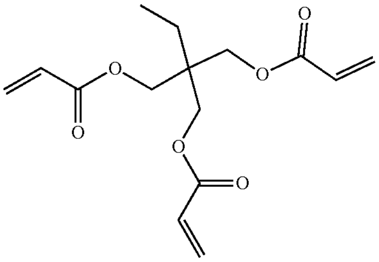

-continued (3-7)

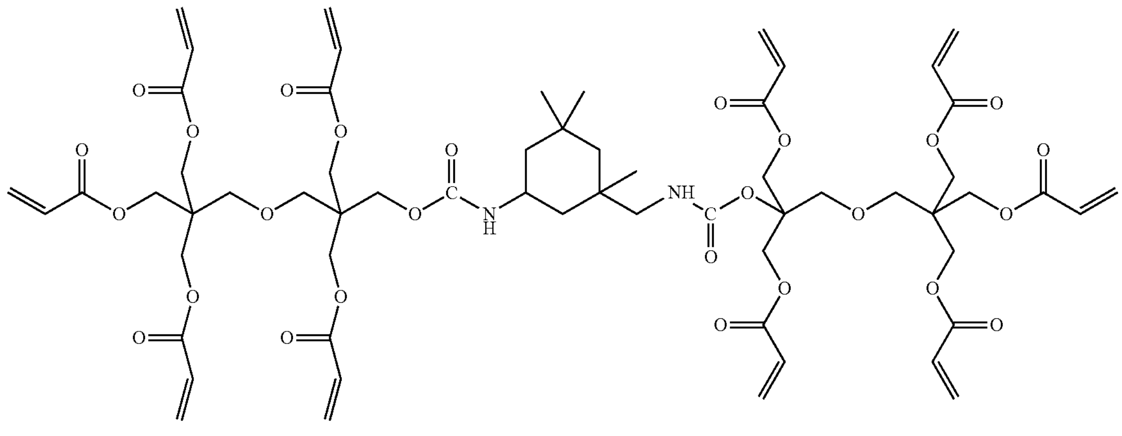

The protection layer may contain an additive, such as an antioxidant, a UV absorber, a plasticizer, a leveling agent, a lubricity-imparting agent, or an abrasion resistance-improving agent. Specific examples thereof include a hindered phenol compound, a hindered amine compound, a sulfur compound, a phosphorus compound, a benzophenone compound, a siloxane-modified resin, a silicone oil, fluorine resin particles, polystyrene resin particles, polyethylene resin particles, silica particles, alumina particles, and boron nitride particles.

The protection layer may be formed by: preparing a coating liquid for a protection layer containing the above-mentioned respective materials and a solvent; forming a coating film of the coating liquid on the charge transporting layer or the monolayer type photosensitive layer; and drying and/or curing the coating film. Examples of the solvent to be used in the coating liquid include an alcohol-based solvent, a ketone-based solvent, an ether-based solvent, a sulfoxide-based solvent, an ester-based solvent, and an aromatic hydrocarbon-based solvent.

<Electroconductive Layer>

In the electrophotographic photosensitive member of the present invention, an electroconductive layer may be arranged on the support. The arrangement of the electroconductive layer can conceal a flaw and unevenness on the surface of the support, and can control the reflection of light on the surface of the support. The electroconductive layer preferably contains electroconductive particles and a resin. A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, nichrome, copper, zinc, and silver.

Of those, the metal oxide is preferably used as the electroconductive particles. In particular, titanium oxide, tin oxide, or zinc oxide is more preferably used.

When the metal oxide is used as the electroconductive particles, the surface of the metal oxide may be treated with a silane coupling agent or the like, or the metal oxide may be doped with an element such as phosphorus or aluminum, or an oxide thereof.

In addition, the electroconductive particles may each be of a laminated configuration including a core particle and a covering layer covering the core particle. The core particle is, for example, titanium oxide, barium sulfate, or zinc oxide. The covering layer is, for example, a metal oxide, such as tin oxide.

In addition, when the metal oxide is used as the electroconductive particles, the volume-average particle diameter of the particles is preferably 1 to 500 nm, more preferably 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain, for example, a concealing agent, such as a silicone oil, resin particles, or titanium oxide.

The average thickness of the electroconductive layer is preferably 1 to 50 μm, particularly preferably 3 to 40 μm. The electroconductive layer may be formed by: preparing a coating liquid for an electroconductive layer containing the above-mentioned respective materials and a solvent; forming a coating film of the coating liquid on the support; and drying the coating film. Examples of the solvent to be used in the coating liquid include an alcohol-based solvent, a sulfoxide-based solvent, a ketone-based solvent, an ether-based solvent, an ester-based solvent, and an aromatic hydrocarbon-based solvent. A dispersion method for the dispersion of the electroconductive particles in the coating liquid for an electroconductive layer is, for example, a method including using a paint shaker, a sand mill, a ball mill, or a liquid collision-type high-speed dispersing machine.

<Undercoat Layer>

In the electrophotographic photosensitive member of the present invention, an undercoat layer may be arranged on the support or the electroconductive layer. The arrangement of the undercoat layer can improve an adhesive function between layers and impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron transporting substance, a metal oxide, a metal, an electroconductive polymer, and the like for the purpose of improving electric characteristics. Of those, an electron transporting substance and a metal oxide are preferably used.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-mentioned monomer having a polymerizable functional group to form the undercoat layer as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

In addition, the undercoat layer may further contain an additive. The average thickness of the undercoat layer is preferably 0.1 to 50 μm, more preferably 0.2 to 40 μm, particularly preferably 0.3 to 30 μm.

The undercoat layer may be formed by: preparing a coating liquid for an undercoat layer containing the above-mentioned respective materials and a solvent; forming a coating film of the coating liquid on the support or the electroconductive layer; and drying and/or curing the coating film. Examples of the solvent to be used in the coating liquid include an alcohol-based solvent, a ketone-based solvent, an ether-based solvent, an ester-based solvent, and an aromatic hydrocarbon-based solvent.

[Process Cartridge and Electrophotographic Apparatus]

The electrophotographic photosensitive member described in the foregoing may be included in a process cartridge that integrally supports at least one step selected from the group consisting of: a charging unit; a developing unit; a transfer unit; and a cleaning unit. The process cartridge is characterized by being detachably attachable onto a main body of an electrophotographic apparatus.

Figure 5:
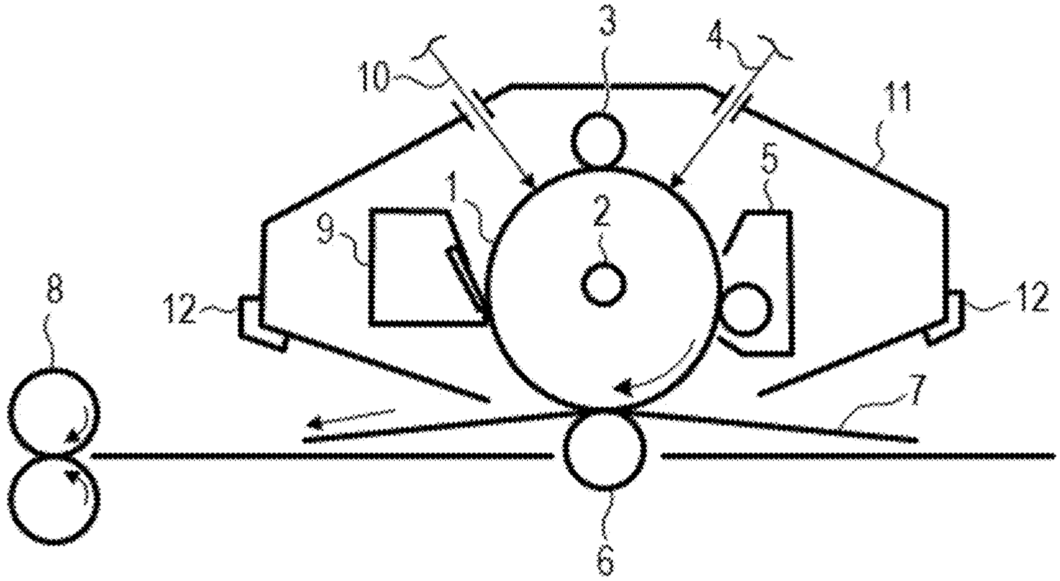
FIG. 5 is a conceptual diagram for illustrating an electrophotographic image forming apparatus.

An example of the schematic construction of an electrophotographic apparatus including a process cartridge including the electrophotographic photosensitive member of the present invention is illustrated in FIG. 5.

An electrophotographic photosensitive member 1 having a cylindrical shape is rotationally driven about a shaft 2 in an arrow direction at a predetermined peripheral speed. The surface of the electrophotographic photosensitive member 1 is charged to a predetermined positive or negative potential by a charging unit 3. Although a roller charging system based on a roller-type charging member is illustrated in FIG. 5, a charging system such as a corona charging system, a proximity charging system, or an injection charging system may be adopted. The charged surface of the electrophotographic photosensitive member 1 is irradiated with exposure light 4 from an exposing unit (not shown), and hence an electrostatic latent image corresponding to target image information is formed thereon. The electrostatic latent image formed on the surface of the electrophotographic photosensitive member 1 is developed with a toner stored in a developing unit 5, and a toner image is formed on the surface of the electrophotographic photosensitive member 1. The toner image formed on the surface of the electrophotographic photosensitive member 1 is transferred onto a transfer material 7 by a transfer unit 6. The transfer material 7 onto which the toner image has been transferred is conveyed to a fixing unit 8, is subjected to treatment for fixing the toner image, and is printed out to the outside of the electrophotographic apparatus. The electrophotographic apparatus may include a cleaning unit 9 for removing a deposit, such as the toner remaining on the surface of the electrophotographic photosensitive member 1 after the transfer. In addition, a so-called cleaner-less system for removing the deposit with the developing unit or the like without separate arrangement of the cleaning unit may be used. The electrophotographic apparatus may include an electricity-removing mechanism for subjecting the surface of the electrophotographic photosensitive member 1 to electricity-removing treatment with pre-exposure light 10 from a pre-exposing unit (not shown). In addition, a guiding unit 12, such as a rail, may be arranged for detachably attaching a process cartridge 11 of the present invention onto the main body of an electrophotographic apparatus.

The electrophotographic photosensitive member of the present invention may be used in, for example, a laser beam printer, an LED printer, and a copying machine.

[Measurement Methods for Protection Layer of Electrophotographic Photosensitive Member]

Methods of measuring the hardness and elastic deformation ratio of the protection layer, the volume-average particle diameter Dm and number-average particle diameter Dn of the particles, the average thickness T of the resin portion of the protection layer, the coverage and coefficient of variation of the particles in the protection layer, and the Young's modulus of the exposed particles in the protection layer in the electrophotographic photosensitive member of the present invention are described.

<Measurement of Hardness and Elastic Deformation Ratio of Protection Layer (Surface Layer)>

The universal hardness value (HU) and elastic deformation ratio (We) were measured with a microhardness measuring device Fischerscope H100V (manufactured by Fischer Instruments K.K.). The measurement was performed under an environment of a temperature of 23° C. and a humidity of 50% RH through use of a Vickers quadrangular pyramid diamond indenter having a facing angle of 136° as an indenter. The diamond indenter was indented into the surface of the protection layer to be measured, and a load of up to 2 mN was applied over 7 seconds. After that, the indentation depth was continuously measured until the load was gradually reduced to 0 mN over 7 seconds. The universal hardness value (HU) and elastic deformation ratio (We) were determined from the obtained results.

<Method of Measuring Volume-Average Particle Diameter Dm and Number-Average Particle Diameter Dn of Particles>

The volume-average particle diameter is measured with a Zetasizer Nano-ZS (manufactured by Malvern Panalytical Ltd.). A particle diameter can be measured with the device by a dynamic light scattering method. First, a sample to be measured is diluted and adjusted so that a solid-liquid ratio is 0.10 mass % (±0.02 mass %), collected in a quartz cell, and placed in a measurement portion. As a dispersion medium, water or a mixed solvent of methyl ethyl ketone/methanol is used when the sample is inorganic fine particles, and water is used when the sample is resin particles or an external additive for toner. As the measurement conditions, the refractive index of the sample and the refractive index, viscosity, and temperature of the dispersion solvent are input and measured with control software Zetasizer Software 6.30. The volume-average particle diameter Dm and the number-average particle diameter Dn are determined.

The refractive index of the particles is adopted from the “Refractive index of solids” described on page 517 of Vol. II of Handbook of Chemistry: Pure Chemistry, Revised 4th ed. (edited by The Chemical Society of Japan, Maruzen Co., Ltd.). As the refractive index of the resin particles, the refractive index of the resin used for the resin particles, which is incorporated into the control software, is adopted. However, when there is no incorporated refractive index, the value described in National Institute for Materials Science Polymer Database is used. The refractive index of the external additive for toner is calculated by taking a weight average from the refractive index of the inorganic fine particles and the refractive index of the resin used for the resin particles. As the refractive index, viscosity, and temperature of the dispersion solvent, the numerical values incorporated into the control software are selected. In the case of a mixed solvent, the weight average of the mixed dispersion medium to be mixed is taken.

<Method of Determining Average Thickness T of Resin Portion of Protection Layer>

The electrophotographic photosensitive member of the present invention is cut into 5 mm-square pieces to provide a sample. The surface of the sample (surface corresponding to the surface of the electrophotographic photosensitive member) is coated with platinum for 30 seconds with an evaporator. Cutting processing is performed in a depth direction by 10 μm in length and 10 μm in width with a gallium ion beam through use of an FIB-SEM (NVision 40, manufactured by Carl Zeiss). SEM observation was performed at an acceleration voltage of 5 kV and a focal length of WD=5 mm, and the average thickness of the resin portion was determined from the resultant sectional view through use of image processing software [ImageJ (available from https://imagej.nih.gov/ij/)]. Specifically, a portion containing no particles was extracted, the thickness was determined at all pixel positions in a sectional longitudinal direction of the resultant image, and the determined thicknesses were integrated and averaged.

<Method of Measuring Coverage and Coefficient of Variation of Particles in Protection Layer>

In the electrophotographic photosensitive member of the present invention, in the case where the surface of the protection layer is viewed from a top, when the total area of the exposed portions of the particles is represented by S1 and the total area of a portion other than the exposed portions of the particles is represented by S2, S1/(S1+S2) (hereinafter referred to as “coverage”) is calculated as described below.

With regard to the particles on the surface of the protection layer, a photographic image of the surface of the protection layer of the photosensitive member taken with a scanning electron microscope (SEM) (“S-4800”, manufactured by JEOL Ltd.) at a magnification of 30,000 times is captured with a scanner, and the particles of the photographic image are subjected to binarization processing with an image processing analyzer (“LUZEX AP”, manufactured by Nireco Corporation). The coverage S1/(S1+S2) (%) is calculated with S1 representing the total area of the exposed portions of the particles on the photosensitive member in one field of view and S2 representing the total area of a portion other than the exposed portions of the particles. The coverage is calculated for a total of 10 fields of view, and an average value of the resultant coverages is defined as the coverage of the particles on the surface of the protection layer of the photosensitive member.

In addition, a value obtained by dividing the standard deviation obtained from the total of 10 fields of view by the average value is defined as a coefficient of variation of the coverage of the particles.

<Method of Measuring Young’s Modulus of Exposed Particles on Surface of Protection Layer>

As an evaluation machine, an SPM probe station (“Nano-NaviReal” manufactured by Hitachi High-Tech Science Corporation) including a scanning probe microscope (“S-image” manufactured by Hitachi High-Tech Science Corporation) having a heater built therein was used. Prior to the measurement, the evaluation machine was calibrated through use of polymethyl methacrylate (PMMA) particles as a reference substance under the condition of an allowable range of 2.920±0.119 GPa (Young’s modulus). The Young’s modulus of PMMA measured with the evaluation machine after calibration was 3.01 GPa.

The particles on the surface of the protection layer of the electrophotographic photosensitive member were measured with the SPM, and an average value of 10 measurement results was defined as the Young’s modulus of the particles.

According to the present invention, the contact area between the toner and the electrophotographic photosensitive member can be reduced, and as a result, satisfactory transferability can be achieved.

EXAMPLES

The present invention is described in more detail below by way of Examples and Comparative Examples. The present invention is by no means limited to the following Examples without departing from the gist of the present invention.

In the description of the following Examples, “part(s)” is by mass unless otherwise specified. In addition, the thicknesses of the respective layers of each of the electrophotographic photosensitive members of Examples and Comparative Examples were determined with an eddy current-type thickness meter (FISCHERSCOPE, manufactured by Fischer Instruments K.K.), or determined by converting the mass per unit area into a specific gravity.

<Production Example of Electrophotographic Photosensitive Member 1>

An aluminum cylinder (JIS-A3003, aluminum alloy) having a diameter of 20 mm and a length of 257.5 mm was used as a support (electroconductive support).

(Production Example of Coating Liquid 1 for Electroconductive Layer)

Anatase-type titanium dioxide (average primary particle diameter: 150 nm, content of niobium: 0.20 wt %) 100 parts by mass Pure water 1,000 parts by mass The above-mentioned mixture was dispersed to provide 1 L of an aqueous suspension, followed by heating to 60° C.

A niobium solution in which 3 parts by mass of niobium pentachloride ($NbCl_5$) was dissolved in 100 mL of 11.4 mol/L hydrochloric acid, a titanium niobate liquid in which 600 mL of a titanium sulfate solution containing 33.7 parts by mass of Ti was mixed, and 10.7 mol/L of a sodium hydroxide solution were simultaneously dropped over 3 hours so that the pH of the suspension became from 2 to 3. After the completion of dropping, the suspension was filtered, washed, and dried at 110° C. for 8 hours.

The dried product was subjected to heat treatment at 800° C. for 1 hour in an air atmosphere to provide powder of metal oxide particles 1 including a core material containing titanium oxide and a covering layer containing titanium oxide doped with niobium.

Next, the following materials were mixed.

Phenolic resin (product name: PLYOPHEN J-325, manufactured by DIC Corporation, resin solid content: 60%, density after curing: 1.3 g/$cm^3$) 50 parts by mass 1-Methoxy-2-propanol 35 parts by mass Metal oxide particles 1 75 parts by mass Glass beads (average particle diameter: 1.0 mm) 120 parts by mass The mixture was placed in a vertical sand mill, and was subjected to dispersion treatment for 4 hours under the conditions of a dispersion liquid temperature of 23° C.±3° C. and a number of revolutions of 1,500 rpm (peripheral speed: 5.5 m/s). Thus, a metal oxide particle dispersion liquid 1 was obtained. The glass beads were removed from the metal oxide particle dispersion liquid 1 with a mesh.

Silicone oil (product name: SH28 PAINT ADDITIVE, manufactured by Dow Corning Toray Co., Ltd.) 0.01 Part by mass Silicone resin particles (product name: TOSPEARL 120, manufactured by Momentive Performance Materials, average particle diameter: 2 μm, density: 1.3 g/$cm^2$) 10 parts by mass The above materials were added to the metal oxide particle dispersion liquid 1, and the mixture was stirred, followed by filtration with PTFE filter paper (product name: PF-060, manufactured by Advantec Toyo Kaisha, Ltd.) under pressure. Thus, a coating liquid 1 for an electroconductive layer was prepared.

(Production Example of Electroconductive Layer 1)

The coating liquid 1 for an electroconductive layer was applied onto the support by dip coating, and the resultant was heated at 140° C. for 1 hour to form an electroconductive layer 1 having a thickness of 20 μm.

(Production Example of Coating Liquid 1 for Undercoat Layer)

Rutile-type titanium oxide particles (average primary particle diameter: 50 nm, manufactured by Tayca Corporation) 100 parts by mass Phenol resin (product name: PLYOPHEN J-325, manufactured by Dainippon Ink and Chemicals, Inc., resin solid content: 60% by mass) 132 parts by mass Toluene 500 parts by mass Vinyltrimethoxysilane (product name: KBM-1003, manufactured by Shin-Etsu Chemical Co., Ltd.) 5 parts by mass Glass beads (diameter: 0.8 mm) 450 parts by mass The above-mentioned components were mixed and stirred for 8 hours. After that, toluene was distilled off under reduced pressure, and the resultant was dried at 120° C. for 3 hours to provide rutile-type titanium oxide particles 1 subjected to surface treatment with vinyltrimethoxysilane.

Next, the following materials were mixed.

Rutile-type titanium oxide particles 1 subjected to surface treatment 18 parts by mass N-Methoxymethylated nylon (product name: TORESIN EF-30T, manufactured by Nagase ChemteX Corporation) 4.5 parts by mass Copolymerized nylon resin (product name: AMILAN CM8000, manufactured by Toray Industries, Inc.) 1.5 parts by mass Methanol 90 parts by mass 1-Butanol 60 parts by mass Acetone 15 parts by mass Gass beads (average particle diameter: 1.0 mm) 120 parts by mass The mixture was placed in a vertical sand mill, and was subjected to dispersion treatment for 5 hours to prepare a coating liquid 1 for an undercoat layer.

(Production Example of Undercoat Layer 1)

The coating liquid 1 for an undercoat layer was applied onto the electroconductive layer 1 by dip coating, and the resultant was heated at 170° C. for 30 minutes to form an undercoat layer 1 having a thickness of 1.0 μm.

(Production Example of Charge Generating Layer 1)

Hydroxygallium phthalocyanine (having peaks at positions of 7.5° and 28.4° in a chart obtained from Cu-Kα characteristic X-ray diffraction) 10 parts by mass Polyvinyl butyral resin (product name: S-LEC BX-1, manufactured by Sekisui Chemical Co., Ltd.) 5 parts by mass Cyclohexanone 200 parts by mass Glass beads 200 parts by mass The above-mentioned materials were dispersed with a sand mill device for 6 hours. 150 Parts by mass of cyclohexanone and 350 parts by mass of ethyl acetate were further added to the dispersion liquid to dilute the dispersion liquid. Thus, a coating liquid 1 for a charge generating layer was obtained. The resultant coating liquid 1 for a charge generating layer was applied onto the undercoat layer 1 by dip coating, and was dried at 95° C. for 10 minutes to form a charge generating layer 1 having a thickness of 0.20 μm.

(Production Example of Charge Transporting Layer 1)

Next, the following materials were prepared.

Charge transporting substance (hole transporting substance) represented by the structural formula (1-1) 5 parts by mass Charge transporting substance (hole transporting substance) represented by the structural formula (1-3) 5 parts by mass Polycarbonate (product name: IUPILON Z400, manufactured by Mitsubishi Engineering-Plastics Corporation) 10 parts by mass Polycarbonate resin having copolymerization units represented by the following structural formula (C-1) and the following structural formula (C-2) (x/y=0.95/0.05: viscosity-average molecular weight=20,000) 0.02 part Those materials were dissolved in a mixed solvent of 60 parts by mass of toluene, 3 parts by mass of methyl benzoate, and 15 parts by mass of tetrahydrofuran to prepare a coating liquid 1 for a charge transporting layer. The coating liquid 1 for a charge transporting layer was applied onto the charge generating layer 1 by dip coating to form a coating film, and the coating film was dried at a drying temperature of 40° C. for 5 minutes to form a charge transporting layer 1 having a thickness of 16 μm.

(C-1)

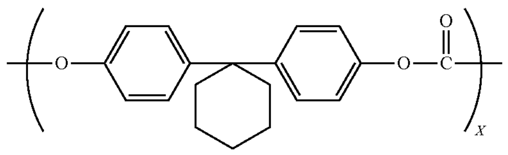

-continued (C-2)

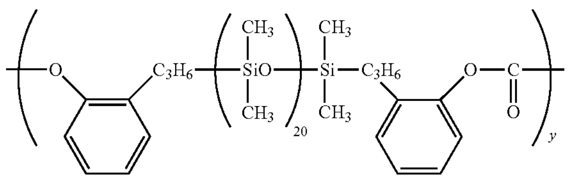

(Production Example of Protection Layer 1 containing Particles)

Particles 1 (KE-P30/shown in Table 1) 4.8 parts by mass

Charge transporting substance (hole transporting substance) represented by the structural formula (2-1) 0.1 part by mass Charge transporting substance (hole transporting substance) represented by the structural formula (3-1) 0.2 part by mass Siloxane-modified acrylic compound (product name: SYMAC US270, manufactured by Toagosei Co., Ltd.) 0.1 part by mass Cyclohexane 30 parts by mass 1-Propanol 70 parts by mass The above-mentioned materials were mixed and stirred to prepare a coating liquid 1 for a protection layer.

The coating liquid 1 for a protection layer was applied onto the charge transporting layer 1 by dip coating to form a coating film, and the resultant coating film was dried at 40° C. for 5 minutes.

After that, under a nitrogen atmosphere, the coating film was irradiated with electron beams for 1.6 seconds under the conditions of an acceleration voltage of 70 kV and a beam current of 5.0 mA while the support (irradiation target body) was rotated at a speed of 300 rpm. The dose of the electron beams at a position on the outermost surface layer was 15 kGy. After that, under the nitrogen atmosphere, first heating was performed by increasing the temperature from 25° C. to 100° C. over 20 seconds. Thus, a protection layer having a thickness of 1.0 μm was formed. An oxygen concentration during a period from the electron beam irradiation to the subsequent heating treatment was 10 ppm or less. Next, in the air, the coating film was naturally cooled until its temperature became 25° C., and second heating treatment was performed for 20 minutes under such a condition that the temperature of the coating film became 135° C. Thus, an electrophotographic photosensitive member 1 was produced. The results of the dispersion state of the particles are shown in Table 3.

<Production Example of Electrophotographic Photosensitive Member 2>

The elements up to the charge generating layer and the charge transporting layer were produced in the same manner as in the production example of the electrophotographic photosensitive member 1, and a protection layer was produced as described below. An electrophotographic photosensitive member 2 was produced in the same manner as in the production example of the electrophotographic photosensitive member 1 except for the foregoing.

(Production Example of Protection Layer 2 containing Particles)

Next, the following materials were prepared.

Particles 1 (KE-P30/shown in Table 1) 4.8 parts by mass

Charge transporting substance (hole transporting substance) represented by the structural formula (1-1) 0.5 part by mass Charge transporting substance (hole transporting substance) represented by the structural formula (1-3) 0.5 part by mass Polycarbonate (product name: IUPILON Z-400, manufactured by Mitsubishi Engineering-Plastics Corporation) 1 part by mass Polycarbonate resin having copolymerization units represented by the structural formula (C-1) and the structural formula (C-2) (x/y=0.95/0.05: viscosity-average molecular weight=20,000) 0.02 part Those materials were dissolved in a mixed solvent of 63 parts by mass of toluene, 3.2 parts by mass of methyl benzoate, and 16 parts by mass of tetrahydrofuran to prepare a coating liquid 2 for a protection layer. The coating liquid 2 for a protection layer was applied onto the charge transporting layer by dip coating to form a coating film, and the coating film was dried at a drying temperature of 40° C. for 5 minutes to form a protection layer 2 to which the particles were exposed.

<Production Example of Electrophotographic Photosensitive Member 3>

In the production example of the electrophotographic photosensitive member 1, a charge transporting layer was produced as described below. An electrophotographic photosensitive member 3 was produced in the same manner as in the production example of the electrophotographic photosensitive member 1 except for the foregoing.

(Production Example of Charge Transporting Layer 2)

Next, the following materials were prepared.

Charge transporting substance (hole transporting substance) represented by the structural formula (1-1) 5 parts by mass Charge transporting substance (hole transporting substance) represented by the structural formula (1-3) 5 parts by mass Polycarbonate (product name: IUPILON Z-200, manufactured by Mitsubishi Engineering-Plastics Corporation) 10 parts by mass Polycarbonate resin having copolymerization units represented by the structural formula (C-1) and the structural formula (C-2) (x/y=0.95/0.05: viscosity-average molecular weight=10,000) 0.02 part Those materials were dissolved in a mixed solvent of 60 parts by mass of toluene, 3 parts by mass of methyl benzoate, and 15 parts by mass of tetrahydrofuran to prepare a coating liquid 2 for a charge transporting layer. The coating liquid 2 for a charge transporting layer was applied onto the charge generating layer by dip coating to form a coating film, and the coating film was dried at a drying temperature of 40° C. for 5 minutes to form a charge transporting layer 2 having a thickness of 16 μm.

<Production Example of Electrophotographic Photosensitive Member 4>

An electrophotographic photosensitive member 4 was produced under the same conditions as those in the production example of the electrophotographic photosensitive member 1 except that the particles to be added were changed to the following particles.

Particles 2 (EPOSTAR MX100/shown in Table 1) 4.8 parts by mass

<Production Example of Electrophotographic Photosensitive Member 5>

An electrophotographic photosensitive member 5 was produced under the same conditions as those in the production example of the electrophotographic photosensitive member 1 except that the particles to be added were changed to the following particles.

Particles 3 (EPOSTAR SS/shown in Table 1) 3.2 parts by mass

<Production Example of Electrophotographic Photosensitive Member 6>

An electrophotographic photosensitive member 6 was produced under the same conditions as those in the production example of the electrophotographic photosensitive member 1 except that the particles to be added were changed to the following particles.

Particles 4 (FS-106/shown in Table 1) 3.6 parts by mass

<Production Example of Electrophotographic Photosensitive Member 7>

An electrophotographic photosensitive member 7 was produced under the same conditions as those in the production example of the electrophotographic photosensitive member 1 except that the particles to be added were changed to the following particles.

Particles 5 (GTR-100/shown in Table 1) 6.0 parts by mass

<Production Example of Electrophotographic Photosensitive Member 8>

An electrophotographic photosensitive member 8 was produced under the same conditions as those in the production example of the electrophotographic photosensitive member 1 except that the particles to be added were changed to the following particles.

Particles 6 (QSG-170/shown in Table 1) 3.2 parts by mass

<Production Example of Electrophotographic Photosensitive Member 9>

An electrophotographic photosensitive member 9 was produced under the same conditions as those in the production example of the electrophotographic photosensitive member 1 except that the usage amount of the siloxane-modified acrylic compound (product name: SYMAC US270, manufactured by Toagosei Co., Ltd.) in the production example of the protection layer 1 containing particles was changed to 0.2 part by mass.

<Production Example of Electrophotographic Photosensitive Member 10>

An electrophotographic photosensitive member 10 was produced under the same conditions as those in the production example of the electrophotographic photosensitive member 1 except that the usage amount of the siloxane-modified acrylic compound (product name: SYMAC US270, manufactured by Toagosei Co., Ltd.) in the production example of the protection layer 1 containing particles was changed to 0.02 part by mass.

<Production Example of Electrophotographic Photosensitive Member 11>

An electrophotographic photosensitive member 11 was produced under the same conditions as those in the production example of the electrophotographic photosensitive member 1 except that the usage amounts of cyclohexane and 1-propanol used in the production example of the protection layer 1 containing particles were changed as follows and the thickness was adjusted by a lifting speed.

Cyclohexane 40 parts by mass

1-Propanol 90 parts by mass

<Production Example of Electrophotographic Photosensitive Member 12>

An electrophotographic photosensitive member 12 was produced under the same conditions as those in the production example of the electrophotographic photosensitive member 1 except that: the usage amounts of cyclohexane and 1-propanol used in the production example of the protection layer 1 containing particles were changed as follows and the thickness was adjusted by a lifting speed.

Cyclohexane 20 parts by mass

1-Propanol 60 parts by mass

<Production Example of Electrophotographic Photosensitive Member 13>

An electrophotographic photosensitive member 13 was produced under the same conditions as those in the production example of the electrophotographic photosensitive member 1 except that the particles to be added were changed to the following particles.

Particles 1 (KE-P30/shown in Table 1) 10.0 parts by mass

<Production Example of Electrophotographic Photosensitive Member 14>

An electrophotographic photosensitive member 14 was produced under the same conditions as those in the production example of the electrophotographic photosensitive member 1 except that the particles to be added were changed to the following particles.

Particles 1 (KE-P30/shown in Table 1) 6.8 parts by mass

<Production Example of Electrophotographic Photosensitive Member 15>

An electrophotographic photosensitive member 15 was produced under the same conditions as those in the production example of the electrophotographic photosensitive member 1 except that the particles to be added were changed to the following particles.

Particles 1 (KE-P30/shown in Table 1) 6.0 parts by mass

<Production Example of Electrophotographic Photosensitive Member 16>

An electrophotographic photosensitive member 16 was produced under the same conditions as those in the production example of the electrophotographic photosensitive member 1 except that the particles to be added were changed to the following particles.

Particles 1 (KE-P30/shown in Table 1) 3.6 parts by mass

<Production Example of Electrophotographic Photosensitive Member 17>

An electrophotographic photosensitive member 17 was produced under the same conditions as those in the production example of the electrophotographic photosensitive member 1 except that the particles to be added were changed to the following particles and the thickness of the protection layer was adjusted by an application speed.

Particles 1 (KE-P30/shown in Table 1) 3.6 parts by mass

<Production Example of Electrophotographic Photosensitive Member 18>

An electrophotographic photosensitive member 18 was produced under the same conditions as those in the production example of the electrophotographic photosensitive member 1 except that the particles to be added were changed to the following particles and the thickness of the protection layer was adjusted by an application speed.

Particles 7 (KE-P10/shown in Table 1) 2.0 parts by mass

<Production Example of Electrophotographic Photosensitive Member 19>

An electrophotographic photosensitive member 19 was produced under the same conditions as those in the production example of the electrophotographic photosensitive member 1 except that the particles to be added were changed to the following particles and the thickness of the protection layer was adjusted by an application speed.

Particles 8 (KE-P50/shown in Table 1) 8.0 parts by mass

<Production Examples of Electrophotographic Photosensitive Members 20 and 21>

Electrophotographic photosensitive members 20 and 21 were produced under the same conditions as those in the production example of the electrophotographic photosensitive member 1 except that the thickness of the protection layer was adjusted by an application speed.

<Production Example of Electrophotographic Photosensitive Member 22>

An electrophotographic photosensitive member 22 was produced under the same conditions as those in the production example of the electrophotographic photosensitive member 1 except that the particles to be added were changed to the following particles and the thickness of the protection layer was adjusted by an application speed.

Particles 1 (KE-P30/shown in Table 1) 12 parts by mass

<Production Example of Electrophotographic Photosensitive Member 23>

An electrophotographic photosensitive member 23 was produced under the same conditions as those in the production example of the electrophotographic photosensitive member 1 except that the particles were not added.

The kind, manufacturing company (manufacturer), number-average particle diameter, volume-average particle diameter, and (volume-average particle diameter)/(number-average particle diameter) of each of the particles 1 to 8 used in the production examples of the above-mentioned electrophotographic photosensitive members are shown in Table 1.

Further, the number of parts of the particles added to the protection layer on the surface of each of the electrophotographic photosensitive members and solvents are shown in Table 2. In Table 2, the binder resin in the produced electrophotographic photosensitive member 2 is different, and hence the solvent conditions are described in the above-mentioned production example of the electrophotographic photosensitive member 2. Further, the particle dispersion state of each of the resultant electrophotographic photosensitive members is shown in Table 3.

TABLE 1

| | Kind of particles (product name) | Manufacturer | Volume-average particle diameter Dm | Number-average particle diameter Dn | Dm/Dn |
|---|---|---|---|---|---|
| Particles 1 | KE-P30 | Manufactured by Nippon Shokubai Co., Ltd. | 310 | 275 | 1.13 |
| Particles 2 | EPOSTAR MX100W | Manufactured by Nippon Shokubai Co., Ltd. | 180 | 150 | 1.20 |
| Particles 3 | EPOSTAR SS | Manufactured by Nippon Shokubai Co., Ltd. | 150 | 100 | 1.50 |
| Particles 4 | FS-106 | Manufactured by Nipponpaint Industrial Coatings Co., Ltd. | 150 | 100 | 1.50 |
| Particles 5 | GTR100 | Manufactured by Sakai Chemical Industry Co., Ltd. | 420 | 260 | 1.62 |
| Particles 6 | QSG-170 | Manufactured by Shin-Etsu Silicone | 192 | 150 | 1.28 |
| Particles 7 | KE-P10 | Manufactured by Nippon Shokubai Co., Ltd. | 124 | 110 | 1.13 |
| Particles 8 | KE-P50 | Manufactured by Nippon Shokubai Co., Ltd. | 550 | 480 | 1.15 |

TABLE 2

| | Protection layer | | | |
|---|---|---|---|---|
| | Particles | | Solvent | |
| | Kind | Addition amount (parts by mass) | 1-Propanol | Cyclohexane |
| Electrophotographic photosensitive member 1 | Particles 1 | 4.8 | 70 | 30 |
| Electrophotographic photosensitive member 2 | Particles 1 | 4.8 | — | — |
| Electrophotographic photosensitive member 3 | Particles 1 | 4.8 | 70 | 30 |
| Electrophotographic photosensitive member 4 | Particles 2 | 4.8 | 70 | 30 |
| Electrophotographic photosensitive member 5 | Particles 3 | 3.2 | 70 | 30 |
| Electrophotographic photosensitive member 6 | Particles 4 | 3.6 | 70 | 30 |
| Electrophotographic photosensitive member 7 | Particles 5 | 6.0 | 70 | 30 |
| Electrophotographic photosensitive member 8 | Particles 6 | 3.2 | 70 | 30 |
| Electrophotographic photosensitive member 9 | Particles 1 | 4.8 | 70 | 30 |
| Electrophotographic photosensitive member 10 | Particles 1 | 4.8 | 70 | 30 |

TABLE 2-continued

| | Protection layer: Particles: Kind | Protection layer: Particles: Addition amount (parts by mass) | Protection layer: Solvent: 1-Propanol | Protection layer: Solvent: Cyclohexane |
|---|---|---|---|---|
| Electrophotographic photosensitive member 11 | Particles 1 | 4.8 | 90 | 40 |
| Electrophotographic photosensitive member 12 | Particles 1 | 4.8 | 60 | 20 |
| Electrophotographic photosensitive member 13 | Particles 1 | 10.0 | 70 | 30 |
| Electrophotographic photosensitive member 14 | Particles 1 | 6.8 | 70 | 30 |
| Electrophotographic photosensitive member 15 | Particles 1 | 6.0 | 70 | 30 |
| Electrophotographic photosensitive member 16 | Particles 1 | 3.6 | 70 | 30 |
| Electrophotographic photosensitive member 17 | Particles 1 | 3.6 | 70 | 30 |
| Electrophotographic photosensitive member 18 | Particles 7 | 2.0 | 70 | 30 |
| Electrophotographic photosensitive member 19 | Particles 8 | 8.0 | 70 | 30 |
| Electrophotographic photosensitive member 20 | Particles 1 | 4.8 | 70 | 30 |
| Electrophotographic photosensitive member 21 | Particles 1 | 4.8 | 70 | 30 |
| Electrophotographic photosensitive member 22 | Particles 1 | 12.0 | 70 | 30 |
| Electrophotographic photosensitive member 23 | — | — | 70 | 30 |

TABLE 3

| | Protection layer: Hardness (HU): H1 [N/mm$^2$] | Protection layer: Hardness (HU): H2 [N/mm$^2$] | Protection layer: Elastic deformation ratio (We): G1 [%] | Protection layer: Elastic deformation ratio (We): G2 [%] | Protection layer: Thickness T: T [nm] | Protection layer: Thickness T: Variation % | Particles: Volume-average particle diameter Dm [nm] | Particles: Number-average particle diameter Dn [nm] | Particles: Dispersion Dm/Dn | Particles: Bottoming particles % | Particles: S1/(S1 + S2) |
|---|---|---|---|---|---|---|---|---|---|---|---|
| Electrophotographic photosensitive member 1 | 260 | 220 | 54 | 45 | 200 | 20 | 310 | 275 | 1.13 | 60 | 0.60 |
| Electrophotographic photosensitive member 2 | 260 | 260 | 54 | 54 | 200 | 20 | 310 | 275 | 1.13 | 60 | 0.60 |
| Electrophotographic photosensitive member 3 | 230 | 220 | 54 | 45 | 200 | 20 | 310 | 275 | 1.13 | 60 | 0.60 |
| Electrophotographic photosensitive member 4 | 260 | 220 | 54 | 45 | 110 | 20 | 180 | 150 | 1.20 | 60 | 0.60 |
| Electrophotographic photosensitive member 5 | 260 | 220 | 54 | 45 | 90 | 20 | 150 | 100 | 1.50 | 60 | 0.60 |
| Electrophotographic photosensitive member 6 | 260 | 220 | 54 | 45 | 90 | 20 | 150 | 100 | 1.50 | 60 | 0.60 |
| Electrophotographic photosensitive member 7 | 260 | 220 | 54 | 45 | 250 | 20 | 420 | 260 | 1.62 | 60 | 0.60 |
| Electrophotographic photosensitive member 8 | 260 | 220 | 54 | 45 | 110 | 20 | 192 | 150 | 1.28 | 60 | 0.60 |
| Electrophotographic photosensitive member 9 | 260 | 220 | 54 | 45 | 200 | 15 | 310 | 275 | 1.13 | 60 | 0.60 |

TABLE 3-continued

| | Protection layer | | | | | | Particles | | | | |
|---|---|---|---|---|---|---|---|---|---|---|---|
| | Hardness (HU) | | Elastic deformation ratio (We) | | Thickness T | | Volume-average particle diameter | Number-average particle diameter | | Bottoming | |
| | H1 [N/mm$^2$] | H2 [N/mm$^2$] | G1 [%] | G2 [%] | T [nm] | Variation % | Dm [nm] | Dn [nm] | Dispersion Dm/Dn | particles % | S1/ (S1 + S2) |
| Electrophotographic photosensitive member 10 | 260 | 22 | 54 | 45 | 200 | 25 | 310 | 275 | 1.13 | 60 | 0.60 |
| Electrophotographic photosensitive member 11 | 260 | 220 | 54 | 45 | 200 | 20 | 310 | 275 | 1.13 | 50 | 0.60 |
| Electrophotographic photosensitive member 12 | 260 | 220 | 54 | 45 | 200 | 20 | 310 | 275 | 1.13 | 40 | 0.60 |
| Electrophotographic photosensitive member 13 | 260 | 220 | 54 | 45 | 200 | 20 | 310 | 275 | 1.13 | 60 | 0.95 |
| Electrophotographic photosensitive member 14 | 260 | 220 | 54 | 45 | 200 | 20 | 310 | 275 | 1.13 | 60 | 0.70 |
| Electrophotographic photosensitive member 15 | 260 | 220 | 54 | 45 | 200 | 20 | 310 | 275 | 1.13 | 60 | 0.50 |
| Electrophotographic photosensitive member 16 | 260 | 220 | 54 | 45 | 200 | 20 | 310 | 275 | 1.13 | 60 | 0.40 |
| Electrophotographic photosensitive member 17 | 260 | 220 | 54 | 45 | 200 | 20 | 310 | 275 | 1.13 | 60 | 0.60 |
| Electrophotographic photosensitive member 18 | 260 | 220 | 54 | 45 | 80 | 20 | 124 | 110 | 1.13 | 60 | 0.60 |
| Electrophotographic photosensitive member 19 | 260 | 220 | 54 | 45 | 330 | 20 | 550 | 480 | 1.15 | 60 | 0.60 |
| Electrophotographic photosensitive member 20 | 260 | 220 | 54 | 45 | 200 | 20 | 310 | 275 | 1.13 | 60 | 0.10 |
| Electrophotographic photosensitive member 21 | 260 | 220 | 54 | 45 | 200 | 20 | 310 | 275 | 1.13 | — | 0.50 |
| Electrophotographic photosensitive member 22 | 260 | 220 | 54 | 45 | 200 | 20 | 310 | 275 | 1.13 | — | 0.50 |
| Electrophotographic photosensitive member 23 | 260 | 220 | 54 | 45 | 200 | 20 | — | — | — | — | — |

Examples 1 to 19

Evaluations of transferability and endurance density transition described below were performed through use of the electrophotographic photosensitive members 1 to 6, 8 to 15, 17 to 19, 21, and 22 produced above. The resultant evaluation results are shown in Table 4.

The cases of using the electrophotographic photosensitive members 1 to 6, 8 to 15, 17 to 19, 21, and 22 were defined as Examples 1 to 19 in the stated order.

Comparative Examples 1 to 4

In Comparative Example 1, evaluations of transferability and endurance density transition described below were performed through use of the electrophotographic photosensitive member 7 containing the particles 5 having Dm/Dn of 1.5 or more.

In Comparative Examples 2 and 3, evaluations of transferability and endurance density transition described below were performed through use of the electrophotographic photosensitive members 16 and 20 each having S1/(S1+S2) of 0.50 or less.

In Comparative Example 4, evaluations of transferability and endurance density transition described below were performed through use of the electrophotographic photosensitive member 23 containing no particles.

The resultant evaluation results are shown in Table 4.

<Evaluation Methods>

<Evaluation of Transferability>

As an evaluation machine, a reconstructed machine of a laser beam printer "LBP712Ci" manufactured by Canon Inc. was used. The printer was reconstructed as follows: the main body and software of the evaluation machine were changed to enable a change in bias to be applied in a transferring step.

Toner was loaded into a toner cartridge of the evaluation machine, and the toner cartridge was left to stand under a normal-temperature and normal-humidity environment (25° C., 50% RH; hereinafter also referred to as "N/N") for 24 hours. The toner cartridge after 24 hours of the standing under the normal-temperature and normal-humidity environment was mounted on the above-mentioned evaluation machine, and an image having a print percentage of 5.0% was printed out on up to 500 sheets of A4 paper under the N/N environment as follows: margins each having a width of 50 mm were arranged on the left and right sides of the paper, and the image was printed out on the central portion of the paper in its horizontal direction.

The evaluation was performed by: outputting solid images at the initial stage of its use (after the printing on the first sheet) and after the printing on the 500 sheets (after its long-term use); attaching a transparent pressure-sensitive adhesive tape made of polyester onto the photosensitive member having transfer residual toner thereon at the time of the formation of the solid images; and peeling the pressure sensitive adhesive tape.

A density difference obtained by subtracting the density in the case of attaching only the pressure-sensitive adhesive tape onto paper from the density in the case of attaching the pressure-sensitive adhesive tape that had been peeled onto paper was calculated. Density measurement was performed at five positions, and an arithmetic average value thereof was determined. Then, the quality of transferability was determined from the value of the density difference (referred to as "transfer residual density") based on the following evaluation criteria. The density was measured with an X-Rite color reflection densitometer (manufactured by X-Rite, Inc., X-Rite 500 Series).

(Evaluation Criteria)

A: Transfer residual density is less than 0.2.

B: Transfer residual density is 0.2 or more and less than 0.5.

C: Transfer residual density is 0.5 or more and less than 1.0.

D: Transfer residual density is 1.0 or more.

<Evaluation of Endurance Density Transition>

Under the condition that the reconstructed machine was placed under a high-temperature and high-humidity (30° C., 80% RH) environment, the density transition of a durability test was evaluated. An original image in which 20 mm-square solid black patches were arranged at five points in a development area was output, and the development bias was set so that the initial reflection density was 1.3. Next, a character image having a print percentage of 1% was output on 10,000 sheets. As the sheet, plain paper CS-680 (68 g/m$^2$) (Canon Marketing Japan Inc.) was used. Durability was evaluated by comparing the density difference of the image density after the durability test to the density of the initial image that was an average density of the five points of the solid black patches.

The image density was obtained by measuring a density relative to a blank portion of the original image with "Macbeth reflection densitometer RD918" (manufactured by Macbeth).

The quality of durability was evaluated based on the following criteria.

(Evaluation Criteria)

A: Density difference is less than 0.1.

B: Density difference is 0.10 or more and less than 0.15.

C: Density difference is 0.15 or more and less than 0.20.

D: Density difference is 0.20 or more.

TABLE 4

| | Transferability | | Durability | |
|---|---|---|---|---|
| | Transferability rank | Transfer residual density | Durability rank | Density difference |
| Example 1 | A | 0.15 | A | 0.08 |
| Example 2 | A | 0.15 | B | 0.12 |
| Example 3 | A | 0.15 | C | 0.17 |
| Example 4 | B | 0.21 | B | 0.13 |
| Example 5 | A | 0.17 | B | 0.12 |
| Example 6 | A | 0.18 | A | 0.08 |
| Example 7 | C | 0.60 | A | 0.07 |
| Example 8 | B | 0.40 | B | 0.12 |
| Example 9 | A | 0.15 | A | 0.08 |
| Example 10 | B | 0.40 | B | 0.12 |
| Example 11 | A | 0.15 | A | 0.08 |
| Example 12 | A | 0.15 | B | 0.13 |
| Example 13 | B | 0.43 | A | 0.07 |
| Example 14 | A | 0.15 | A | 0.08 |
| Example 15 | A | 0.15 | A | 0.08 |
| Example 16 | C | 0.42 | A | 0.09 |
| Example 17 | A | 0.15 | A | 0.08 |
| Example 18 | A | 0.15 | A | 0.08 |
| Example 19 | A | 0.15 | A | 0.08 |
| Comparative Example 1 | D | 1.10 | A | 0.08 |
| Comparative Example 2 | B | 0.30 | C | 0.18 |
| Comparative Example 3 | B | 0.30 | B | 0.13 |
| Comparative Example 4 | D | 1.10 | A | 0.09 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An electrophotographic photosensitive member comprising a charge generating layer, a charge transporting layer, and a protection layer laminated on a support in the stated order, wherein the protection layer comprises a binder resin and particles, and wherein when an average thickness of the protection layer in a site free of the particles is represented by T and a volume-average particle diameter of the particles is represented by Dm in a cross-section of the protection layer, the following formula (a) is satisfied, $$Dm>T \quad \text{Formula (a)}$$

and wherein when a universal hardness of the charge transporting layer is represented by H1 and a universal hardness of the protection layer is represented by H2, the following formula (b) is satisfied, H1>H2 Formula (b).

2. The electrophotographic photosensitive member according to claim 1, wherein when an elastic deformation ratio of the charge transporting layer is represented by G1 and an elastic deformation ratio of the protection layer is represented by G2, the following formula (c) is satisfied $$G1>G2 \quad \text{Formula (c).}$$

3. The electrophotographic photosensitive member according to claim 1, wherein a standard deviation of the volume-average particle diameter Dm of the particles is 20% or less of the volume-average particle diameter.

4. The electrophotographic photosensitive member according to claim 1, wherein when the volume-average particle diameter of the particles is represented by Dm and a number-average particle diameter thereof is represented by Dn, Dm/Dn is 1.5 or less.

5. The electrophotographic photosensitive member according to claim 1, wherein a coefficient of variation of the average thickness T is 20% or less.

6. The electrophotographic photosensitive member according to claim 1, wherein a number of the particles, which are partially exposed from a surface of the protection layer, and which are in contact with an interface between the protection layer and the charge transporting layer, in the cross-section of the protection layer is 50% by number or more with respect to a total number of the particles comprised in the protection layer.

7. The electrophotographic photosensitive member according to claim 1, wherein at least some of the particles are partially exposed from a surface of the protection layer, and wherein in a case where the surface of the protection layer is viewed from a top, when a total area of the exposed portions of the particles is represented by S1 and a total area of a portion other than the exposed portions of the particles is represented by S2, S1/(S1+S2) satisfies the following formula (d).

$$S1/(S1+S2)>0.50 \quad \text{Formula (d)}$$

8. The electrophotographic photosensitive member according to claim 1, wherein the volume-average particle diameter Dm of the particles and the average thickness T of the protection layer satisfy the following formula (e).

$$Dm>2T \quad \text{Formula (e)}$$

9. The electrophotographic photosensitive member according to claim 1, wherein when the universal hardness of the protection layer is represented by H2 and a universal hardness of each of the particles is represented by H3, the following formula (f) is satisfied.

$$H3>H2 \quad \text{Formula (f)}$$

10. The electrophotographic photosensitive member according to claim 1, wherein when the universal hardness of the charge transporting layer is represented by H1, the universal hardness of the protection layer is represented by H2, and a universal hardness of each of the particles is represented by H3, the following formula (g) is satisfied.

$$H3>H1>H2 \quad \text{Formula (g)}$$

11. A process cartridge comprising:

an electrophotographic photosensitive member comprising a charge generating layer, a charge transporting layer, and a protection layer laminated on a support in the stated order, wherein the protection layer comprises a binder resin and particles, and wherein when an average thickness of the protection layer in a site free of the particles is represented by T and a volume-average particle diameter of the particles is represented by Dm in a cross-section of the protection layer, the following formula (a) is satisfied, $$Dm>T \quad \text{Formula (a)}$$

and wherein when a universal hardness of the charge transporting layer is represented by H1 and a universal hardness of the protection layer is represented by H2, the following formula (b) is satisfied, $$H1>H2 \quad \text{Formula (b); and}$$

at least one unit selected from the group consisting of: a charging unit; a developing unit; and a cleaning unit, the process cartridge integrally supporting the electrophotographic photosensitive member and the at least one unit and being detachably attachable onto a main body of an electrophotographic apparatus.

12. An electrophotographic apparatus comprising:

an electrophotographic photosensitive member comprising a charge generating layer, a charge transporting layer, and a protection layer laminated on a support in the stated order, wherein the protection layer comprises a binder resin and particles, and wherein when an average thickness of the protection layer in a site free of the particles is represented by T and a volume-average particle diameter of the particles is represented by Dm in a cross-section of the protection layer, the following formula (a) is satisfied, $$Dm>T \quad \text{Formula (a)}$$

and wherein when a universal hardness of the charge transporting layer is represented by H1 and a universal hardness of the protection layer is represented by H2, the following formula (b) is satisfied, $$H1>H2 \quad \text{Formula (b); and}$$

at least one unit selected from the group consisting of: a charging unit; an exposing unit; a developing unit; and a transfer unit.

* * * * *